(12) United States Patent
Ballin et al.

(10) Patent No.: US 7,394,380 B2
(45) Date of Patent: Jul. 1, 2008

(54) SYSTEM AND METHOD FOR IMPROVED ITEM TRACKING

(75) Inventors: Andrew M. Ballin, New York, NY (US);
John F. Morar, Mahopac, NY (US);
Paul A. Moskowitz, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 11/354,903

(22) Filed: Feb. 16, 2006

(65) Prior Publication Data

US 2007/0188324 A1 Aug. 16, 2007

(51) Int. Cl.
*G08B 1/08* (2006.01)
*G08B 13/14* (2006.01)
*G08B 23/00* (2006.01)
*G08B 5/22* (2006.01)
*G06F 17/00* (2006.01)
*G06F 19/00* (2006.01)
*G06F 7/00* (2006.01)
*G06K 19/06* (2006.01)
*G06Q 10/00* (2006.01)

(52) U.S. Cl. ............ 340/572.1; 340/539.1; 340/539.13; 340/572.1; 340/573.1; 340/825.49; 235/375; 235/384; 235/385; 235/386; 235/492; 700/215; 700/219; 700/224; 700/225; 705/28; 705/29

(58) Field of Classification Search ............. 340/539.1, 340/572.1, 573.1, 573.4, 825.49, 10.1, 10.5, 340/539.13; 235/375–385, 492; 700/216, 700/225, 705; 705/28, 435–462
See application file for complete search history.

(56) References Cited

U.S. PATENT DOCUMENTS

| | | | | | |
|---|---|---|---|---|---|
| 5,151,684 | A | * | 9/1992 | Johnsen | 340/568.1 |
| 5,260,694 | A | * | 11/1993 | Remahl | 340/674 |
| 5,886,634 | A | * | 3/1999 | Muhme | 340/572.1 |
| 6,232,877 | B1 | * | 5/2001 | Ashwin | 340/572.1 |
| 6,300,872 | B1 | * | 10/2001 | Mathias et al. | 340/540 |
| 6,812,838 | B1 | | 11/2004 | Maloney | |
| 6,954,148 | B2 | * | 10/2005 | Pulkkinen et al. | 340/572.1 |
| 6,989,749 | B2 | * | 1/2006 | Mohr | 340/572.1 |
| 7,044,374 | B2 | * | 5/2006 | Allison et al. | 235/385 |
| 7,082,344 | B2 | * | 7/2006 | Ghaffari | 700/115 |
| 7,102,509 | B1 | * | 9/2006 | Anders et al. | 340/539.13 |
| 7,267,262 | B1 | * | 9/2007 | Brown | 235/375 |
| 2001/0041948 | A1 | * | 11/2001 | Ross et al. | 700/226 |
| 2003/0137968 | A1 | | 7/2003 | Lareau et al. | |
| 2003/0160693 | A1 | | 8/2003 | Hisano | |
| 2004/0088070 | A1 | | 5/2004 | Muehl et al. | |
| 2005/0024211 | A1 | | 2/2005 | Maloney | |
| 2005/0068181 | A1 | | 3/2005 | Wang | |
| 2007/0046464 | A1 | * | 3/2007 | Onderko et al. | 340/572.1 |

\* cited by examiner

*Primary Examiner*—George A Bugg
*Assistant Examiner*—Lam P Pham
(74) *Attorney, Agent, or Firm*—McGinn IP Law Group, PLLC; Stephen C. Kaufman

(57) ABSTRACT

A method for tracking objects, including identifying and locating an object using a first method, identifying and locating a person using a second method, and associating the object and the person.

3 Claims, 4 Drawing Sheets

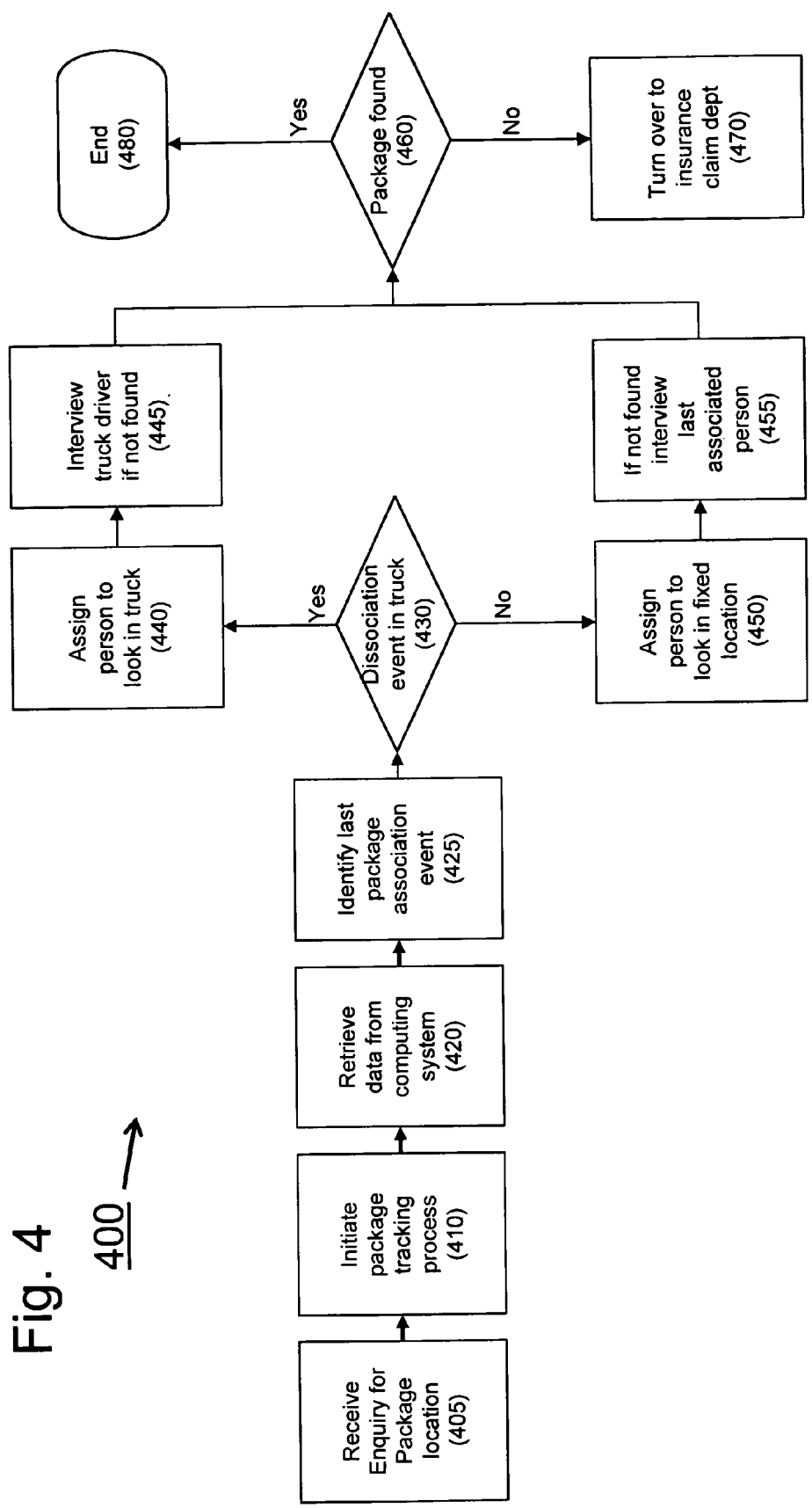

SYSTEM AND METHOD FOR IMPROVED ITEM TRACKING

BACKGROUND OF THE INVENTION

1. Field of the Invention

The present invention generally relates to the field of tagging of objects and people with radio transponders, and more particularly to an improved system and method for determining the location of tagged objects.

2. Description of the Related Art

There is a class of businesses in the world economy that focus on the movement of physical objects from a pre-specified place at a pre-specified time (the pickup) to a pre-specified place at a pre-specified time (the drop-off). The objects being transported may vary dramatically in size (from an envelope to a train locomotive) and may vary dramatically in the environmental restrictions that the object can endure without damage during the time between pickup and drop-off. Any business that performs this type of service can benefit from knowing the attributes (both the space-time location and environmental) that each object will experience (predictive), is experiencing (near real time) or has experienced (logged).

There are several approaches that are currently employed in this and related industries that involve instrumenting each object, instrumenting selected objects, instrumenting test objects whose sole purpose it is to mimic a real object and infer from the handling of the test object what a real object will experience. Such instrumentation may be associated with the object from pickup to drop-off, or, may be associated for only a portion of the pick-up to drop-off such as an instrumented tub that contains an object. In such cases, onboard tub instrumentation will be taken as representative of the object's space-time-environmental conditions during the period of time the object is bonded to the tub. Such approaches require a system that provides logical association and disassociation with temporarily bonded instrumentation.

Another common approach is to instrument the path that objects will follow and associate a space-time position and appropriate environmental measurement with the objects as they encounter various points in the instrumented path. Such measurements may be strung together to infer the space-time-environmental conditions experienced by each object. This second approach (instrumenting the path) has the considerable advantage of minimizing the investment for each object, since the cost of instrumenting the path can be amortized over all monitored objects that transverse the path. Finally, combinations of all these approaches can be used. The final decision about which methods to employ is typically made based on a cost/benefit basis There are many cases where knowledge of an object, or package, location can improve existing processes. Some examples of these processes are:

Movement of packages from a pickup point to actual delivery point.

Movement of packages through a sorting facility.

Movement of packages on loading docks, to ensure packages are placed in the correct container/vehicle Placement of goods in warehouse or stockroom.

In the case of transportation companies, for each package or container there is knowledge of its destination as well as the corresponding routing information. However, a package may be placed on the wrong vehicle during transportation and not follow the optimum route to its destination. Thus, the potential for missing a committed delivery schedule exists, which may result in the transportation company providing refunds to customers and further have a negative impact on customer satisfaction and customer retention for the transportation company.

SUMMARY OF THE INVENTION

In view of the foregoing and other exemplary problems, drawbacks, and disadvantages of the conventional methods and structures, an exemplary feature of the present invention is to provide a system and method for item tracking that uses radio frequency identification, RFID, or other wireless technology, and correlates objects and people and which reduces the opportunity for human errors and improves the efficiency for the movement and placement of goods.

The invention "instruments" people who are moving objects, so that the space-time-environmental characteristics measured by the instrumentation on the person can be logically associated with the space-time-environmental conditions experienced by the object. Such "instrumentation" can provide either predictive, near real-time, or logged information that can be logically associated with the object. The invention also addresses both the types of information monitored and the system that can be used to logically associate and disassociate the object with the person.

The present invention further provides the ability to correlate the location of package as it is placed within a vehicle or container with the knowledge of its preferred route can be used to ensure that the package is following the optimum route to its destination. Additionally, the location information can also be used to ensure that a package is placed in the optimum location inside a delivery vehicle, warehouse or stockroom. In the case of the delivery vehicle, proper placement of the packages within the truck, such as which side of the truck, which shelf and location on the shelf, improves the delivery drivers efficiency and reduces the number of missed deliveries.

In a first exemplary aspect of the present invention, a method for tracking objects includes identifying and locating an object using a first method, identifying and locating a person using a second method, and associating the object and the person.

In a second exemplary aspect of the invention, the method according to the first aspect of the invention preferably further includes tracking the person from a first location to a second location In a third exemplary aspect of the invention, the first method of the method according to the first aspect preferably includes one of reading a bar code associated with the object and reading an radio frequency identification tag associated with the object.

In a fourth exemplary aspect of the invention, the second method of the method according to the first aspect preferably includes reading an active radio frequency identification tag associated with the person.

In a fifth exemplary aspect of the invention, in the method according to the second aspect of the invention, the first location is a conveyor system.

In a sixth exemplary aspect of the invention, in the method according to the second aspect of the invention, the second location is within a transport vehicle.

In a seventh exemplary aspect of the invention, in the method according to the sixth aspect of the invention, the second location within a transport vehicle is precisely determined.

In an eighth exemplary aspect of the invention, the method according to the first aspect of the invention preferably further includes storing information associated with the person, the object, and track between the first location and second location, and using the collected information to locate lost objects.

In a ninth exemplary aspect of the invention, the method according to the first aspect of the invention preferably further includes detecting a disassociation of the object from the person.

In a tenth exemplary aspect of the invention, the method according to the ninth aspect of the invention preferably further includes identifying the location of the object upon the disassociation of the object from the person.

In an eleventh exemplary aspect of the invention, the method according to the first aspect of the invention preferably further includes issuing a warning if the object and the person are improperly associated.

In a twelfth exemplary aspect of the invention, the method according to the second aspect of the invention preferably further includes issuing a warning if the second location is not the intended second location.

In a thirteenth exemplary aspect of the invention, the method according to the second aspect of the invention preferably further includes generating a history of the location of the person when associated with the object and using the generated history to determine the location of the object.

In a fourteenth exemplary aspect of the present invention, is provided a method for tracking objects including associating an object with a person, identifying and locating the person, recording a disassociation of the object with the person, and locating the object based upon the location of the disassociation.

In a fifteenth exemplary aspect of the invention, the method according to the fourteenth aspect of the invention preferably further includes receiving an enquiry for the location of the object, retrieving data regarding the association of the object with the person, retrieving the location of the disassociation of the object with the person, assigning a person to search the retrieved location for the object, and locating the object.

A sixteenth exemplary aspect of the present invention provides a system for tracking objects including first means for determining an identification and location of a person, second means associated with the person for reading identification data associated with an object, and a computer system connected to the first means and the second means by a network, wherein the computer system receives the identification data read by the second means, identifies the object based on the received identification data, identifies the person associated with the second means, associates the object with the person, collects tracking information regarding the location of the person based on data received from the first means until the person and the object are disassociated, and stores the tracking information.

In a seventeenth exemplary aspect of the invention, the first means of the system according to the sixteenth aspect preferably includes at least one of an identification tag attached to the person including a radio frequency identification tag, a ultra-sonic location sensor, and a biometric means including a video camera for vision-system identification of the person.

In an eighteenth exemplary aspect of the invention, the second means of the system according to the seventeenth aspect preferably includes at least one of a bar code reader, radio frequency identification reader, camera, and an ultra-sonic location sensor.

In a nineteenth exemplary aspect of the invention, in the system according to the eighteenth aspect, the computer system further receives an enquiry for the location of the object, retrieves the tracking information, and determines the location of the object upon disassociation of the object with the person.

In a twentieth exemplary aspect of the invention, the network of the system according to the nineteenth aspect preferably includes a wireless network.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 4 is a flowchart of the method for package retrieval.

DETAILED DESCRIPTION OF EXEMPLARY EMBODIMENTS OF THE INVENTION

Figure 1:
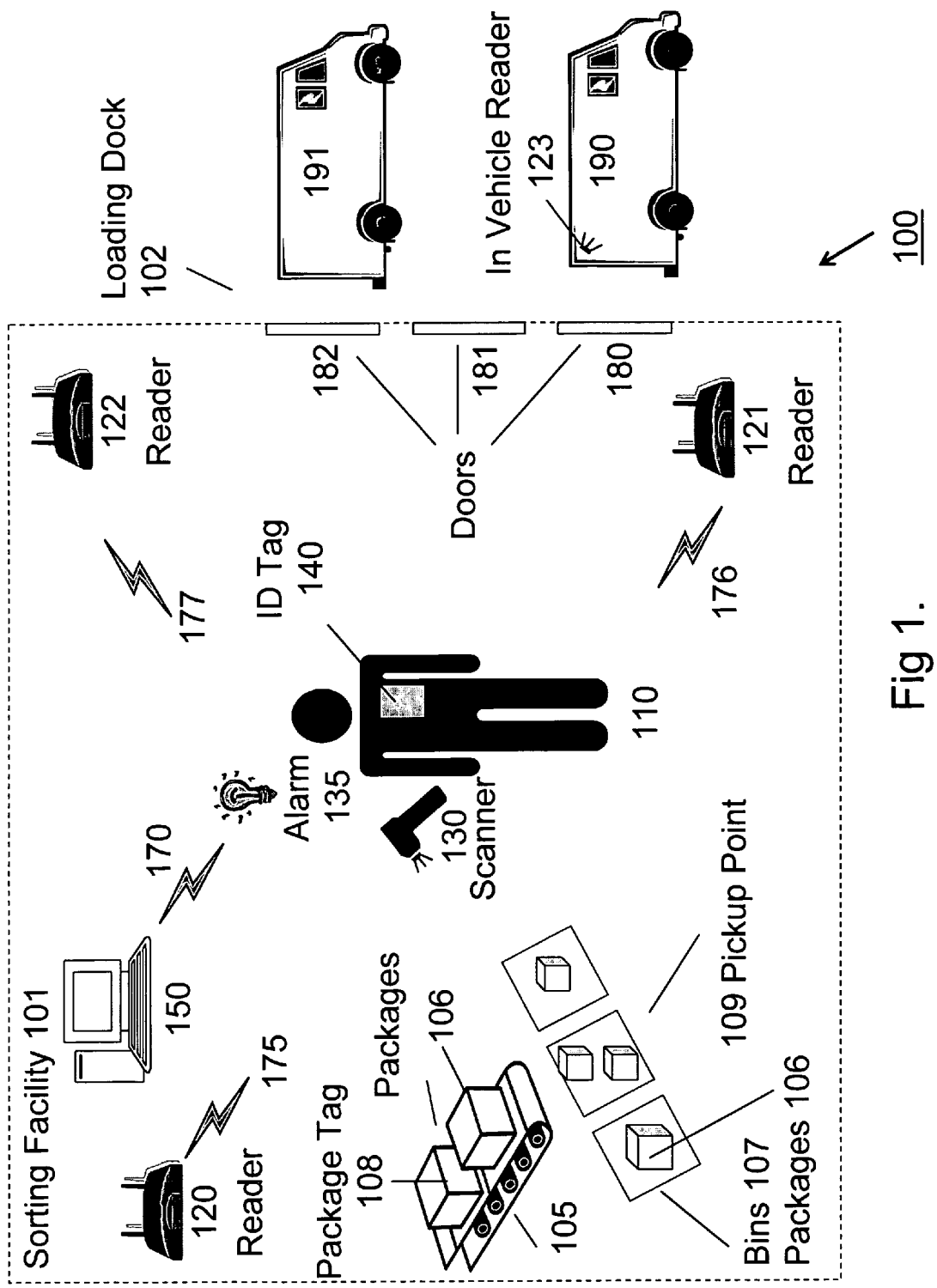
FIG. 1 is a schematic diagram of an exemplary environment of the invention.

Referring now to the drawings, and more particularly to FIGS. 1-4, there are shown exemplary embodiments of the system and method according to the present invention.

Exemplary Embodiment

FIG. 1 illustrates an exemplary embodiment of the system 100 of the present invention.

Every package 106 that enters a sorting facility 101 includes or is provided with a package tag 108, for example, each package 106 may be tagged with a bar code or RFID transponder, also known as an RFID tag 108. This package tag 108 is used to correlate a package 106 with its destination via a computer system 150. Each computing system 150 within facility 101 that a package 106 flows through has knowledge of the optimized routing information for that location.

When the package 106 is received at the loading dock 102 it is scanned by a person 110 using a scanner 130 capable of reading the package tag 108 or the package 106 is scanned by an overhead scanner capable of reading the package tag 108 on the conveyor belt 105. As the package 106 travels through the facility 101 it may be scanned several times, the scan information is combined with the route information to control diverters in the facility that will direct the package 106 to the next appropriate conveyor belt 105. Eventually the package 106 ends up in a bin 107 at the end of the conveyor belt 105. It should be noted that while a system that uses a mechanical conveyor is described, the system and method may also be applied for other means of package routing and movement, e.g. by manual means. The system and method may also be applied in a variety of environments, such as a warehouse, stockroom, retail sales facility, as well the sorting facility.

The bins 107 are located near the outbound loading dock doors 180,181,182 at a pickup point 109 where a person 110 picks up the package 106 to place into a vehicle 190, 191. This person 110 has a scanner 130 which is attached to the computer system 150, for example through a wireless network 170, such as a IEEE 802.11x or its equivalent. The computing system 150 may also communicate with various peripherals using the wireless network 170.

In standard usage, the person 110 scans the package 106 and should then scan another coded identification device, such as a bar code, that represents the door 180 of the loading dock 102 that the person 110 walks through. The bar code representing the door 180 is tied to a vehicle 190 currently at the loading dock door 180. There may be several loading dock doors that are very close together in the facility 101. There may also be more than one person 110 moving the packages 106 from the bins 107 through the doors 180, 181, 182.

The computing system 150 may alert 135 the person 110 if they walk through the wrong loading dock door of the doors 180, 181, 182, such as the loading dock door 182 tied to a vehicle 191 not specified for the package 106. However, it is possible that the alarm 135 may not always be activated, resulting in the package 106 not following the optimum route to its destination. This increases the possibility of a service failure. Experience also shows that the person may not always perform the scan at the doorway 180, 181, 182. This makes tracking of packages very difficult, if not impossible. The present invention eliminates this issue by replacing the doorway scanning with automated data collection, described below.

Further, proper placement of the package 106 in the vehicle 190 increases a driver's efficiency, and in many cases is based on the package handler's knowledge of the vehicle's route. Incorrect placement may result in a problem where the turnover rate of package handlers is very high and new employees may not be familiar with the proper routes. In some other cases, there is a label attached to the package 106 that indicates where the package 106 should be placed inside the vehicle 190. If a package 106 is not placed correctly within the vehicle 190, there may be a risk that the package 106 will not be delivered on time. The present invention allows the detection of the package's 106 location as it is being placed in the vehicle 190 and permit appropriate validation.

Additionally, the system 150 may incorporate voice technology so that the printing and application of package location information label may be avoided, thus improving the efficiency of the system 101. In this manner, the person 110 could be told where to place the package 106 as the person enters the vehicle 190 eliminating the need for the location label.

The present invention employs a dual tracking system. Packages 106 are labeled with a package tag 108, such as bar codes or radio frequency identification, RFID tags. RFID tags are manufactured by several companies, such as Texas Instruments. These package tags 108 may be read in close proximity or at a short range making them appropriate for identification at a fixed point of pickup.

However, such methods are not practical for assuring that a package 106 has passed through a specified loading dock door 180, 181, 182 onto a vehicle 190, 191. If the range of reading is sufficient to assure reading at a door 180, it may make the door identification ambiguous with respect to two adjacent doors 180, 181, both of which may read the package tag 108. For example, ultra-high frequency (UHF) RFID tags may be read at distances on the order of ten meters. Thus, a tag reader at one loading dock door 180 may easily read a UHF RFID tag on a package 106 going through an adjacent door 181.

In the present invention, the person or people 110 who transport the packages 106, e.g. from the pickup point 109 on a conveyor 105 to a truck 190, are also labeled. These people 110 are labeled with active radio transmitting tags 140 that provide a means for determining the location of the person 110 within a few centimeters. Such active tags are known to be manufactured by Multispectral Solutions of Germantown, Md. The position of the tag 140, and thus the person 110, may be determined by a triangulation method using readers 120, 121, 122, which may communicate with the tag 140 by radio waves 175, 176, 177. The readers also send their data to the computing system 150 by means of wires or over the wireless network 170.

At the point at which the package 106 is picked up by the person 110, the package 106 is identified by the reading of the package tag 108, such as a bar code or RFID tag. The package 106 is then located in proximity to the tag reader 130. The person 110 who picks up the package 106 is identified and located by means of the active tag 140. Thus, the two are associated with each other at that time and location by the computing system 150. The person 110 with the package 106 is then tracked to the vehicle 190 where the package 106 is deposited.

The tracking may be of such accuracy that the position within the vehicle 190 where the package 106 is left may also be recorded by the computer system 150. This is done by noting the end point of the person's motion. It may also be determined that the person 110 and the package 106 have become separated, if there is a reader 123 in the truck 190 that records the presence of the package tag 108 after the person 110 has left the truck 190.

In another embodiment, the person 110 has a short range scanner 130 that records the association of the package 106 with the person while the package 106 is within range of the scanner 130. When the signal vanishes, the computer system 150 may determine that the person 110 and the package 106 are no longer associated.

The method may also be applied to real-time monitoring and warning. After the person 110 and the package 106 are associated, a warning, such as an alarm 135, may be issued if the person 110 has a package 106 not intended for him, or if the package 106 is carried to the wrong loading dock door 180.

Figure 2:
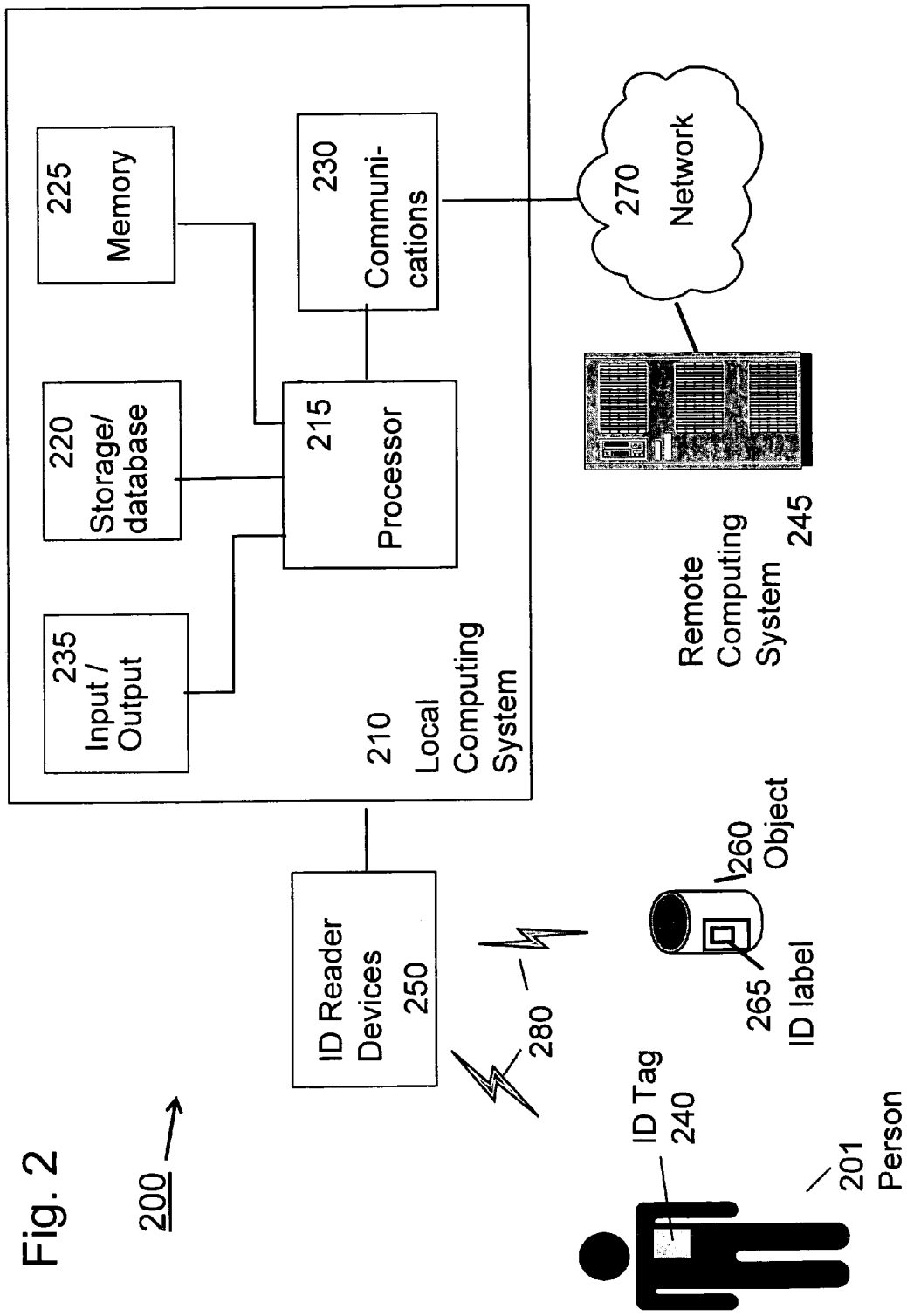
FIG. 2 is a schematic diagram and flowchart of an exemplary computing system architecture of the invention.

FIG. 2 illustrates an exemplary computing system architecture 200 of the present invention.

Referring to FIG. 2, a computing system architecture 200 comprises a computing device or local computing system 210 which may be located at the facility 101 of FIG. 1. The computing device 210 may be a personal computer or server, such as those manufactured by IBM of Armonk, N.Y. The computing device 210 may comprise input/output systems 235, such as a display and keyboard, a storage device 220, such as a hard drive, computer memory 225, a processor 215, and communications capability 230 which permit the computing system to be connected to a network 270, such as the Internet, and thus to other remote computing systems 245.

The computing system 210 is used to control identification, ID, reader devices 250. These ID reader devices 250 may communicate with the computing system 210 by wired or wireless means, such as WiFi, 802.11x, or Bluetooth. The ID reader devices 250, for example, the scanner 130 and readers 120, 121, 122, 123 described above, may comprise bar code readers, RFID readers, cameras, ultra-sonic location sensors, or other ID means. The ID reader devices 250 may be used to locate and identify 280 a person 201 by means of an ID tag 240 attached to the person, e.g. an active or passive RFID tag, or by biometric means including, the use of cameras for vision-system identification. The ID reader devices 250 may also identify and locate an object 260, such as a package 106, which may carry an ID label 265, such as a bar code or passive or active RFID tag.

Data on the identification and position of the person 201 and the object 260 are stored in the computing system 210 along with ID information stored in the system database 220, such as catalogs of ID numbers associated with specific objects, and in the case of packages 106, the predicted routes for the delivery of packages 106. The computing system 210 monitors the association of the object 260 with a person 201. By monitoring the location of the person, e.g. movement of the person, the movement of the object 260 is monitored by inference.

All of the history of the locations of the person 201 and the objects 260 associated with the person 201 may be stored in the database 220 of the computer 210 or remotely in the computer 245. When objects 260, such as packages 106, do not arrive at their intended destination, the databases 220 may be queried to determine the movement of the packages and to ultimately locate or find the lost packages 106.

The input output devices 235 may also control audible and visual alarms, such as alarm 135. The alarms may be activated to issue a warning or alert if a person 201 is associated with an incorrect object or package, e.g., if a person 201 loading a truck bound for Fresno becomes associated with a package bound for Albuquerque, or if the person 201 moves from a first location to a second location and the second location is not the intended second location.

Such alarms may be digital warnings that are sent over the network 270 to a remote computing system 245. The alarm can also be sent to the person 201 associated with the package. This may be accomplished by sending the alert through the network to a personal communications device carried by the person, such as a pager or a cell phone.

Figure 3:
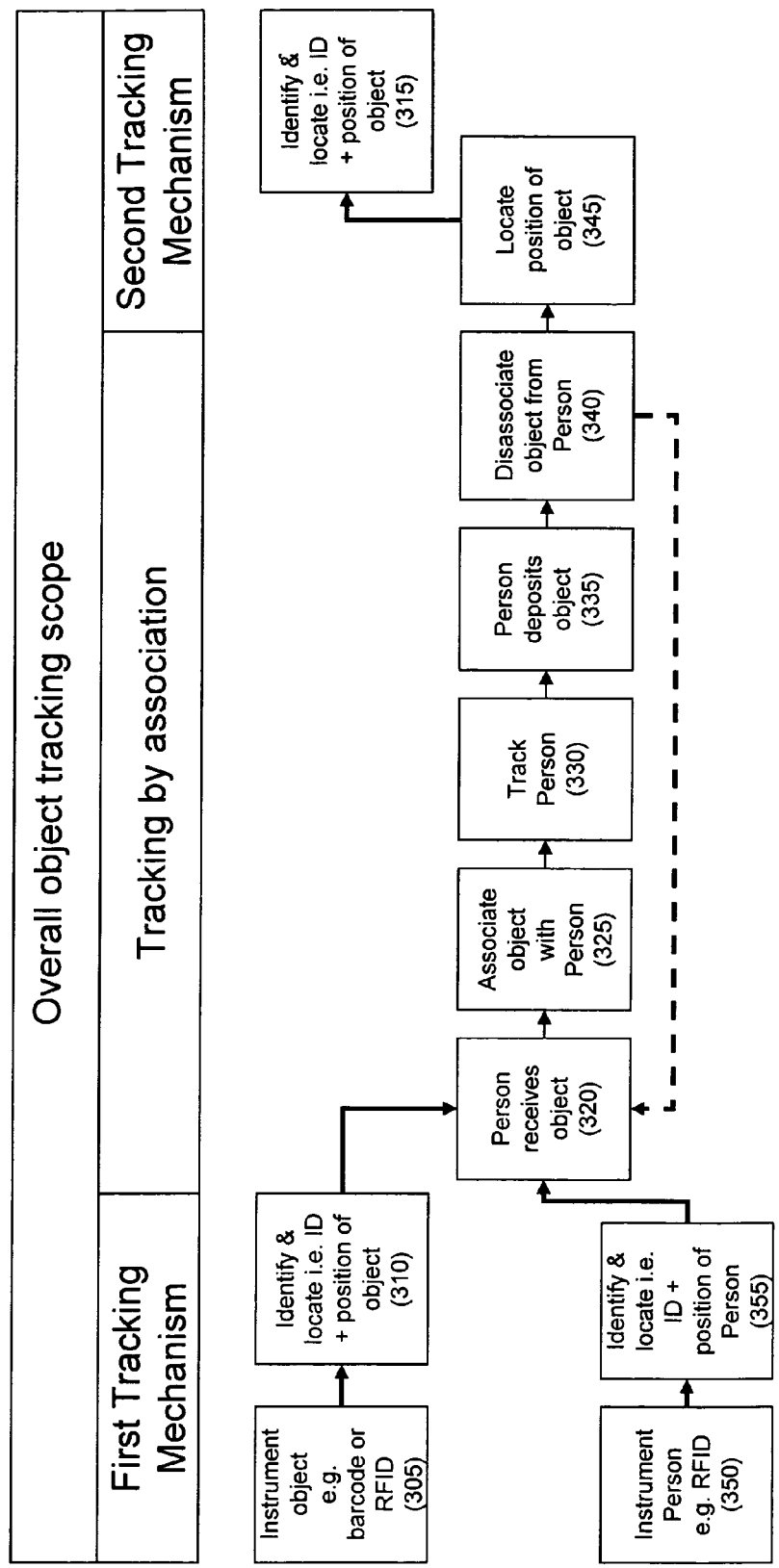
FIG. 3 is a flowchart of the method of the invention.

FIG. 3 is a flowchart illustrating the method 300 of the invention.

FIG. 3 visually documents both setup and ongoing operation of the invention.

Before the method of the invention becomes operational for repeated use it is advisable to perform some the preparation steps as illustrated in step 350 and 355. In step 350, a person is instrumented with a position sensitive tracking devices, such as a position dependent RFID tag or transponder described above, that will be used later in the process to identify the position of the person or some specific spot on the person such as the person's wrist. In step 355, the ID of the position sensitive device is entered in a "tracking by association" system that keeps track of the association of the person and an object. These steps only need to be performed before the person begins each period of operation.

The aim of the overall method described in FIG. 3 is to track the location of an object that leaves the scope of a tracking mechanism (the first tracking mechanism is partially described and is here represented as steps 305 and 310) and transported to the scope of a second tracking mechanism (the second tracking mechanism is partially described and is here represented as step 315 and may be part of or completely separate from the first tracking mechanism).

The first tracking mechanism has some sequence of actions that leave an object in the state of having a known location and ID. In step 305, the object to be tracked is provided with an appropriate tracking instrument, such as a bar code or RFID tag. In step 310, the ID and current location of the object based on the tracking instrument is entered in the "tracking by association" system.

The "tracking by association" system is described in steps 320 through 345 inclusive. In step 320, the person identified in step 355 takes possession of the object identified in step 310. In step 325, the object and the person are associated in the "tracking by association" system. In step 330, the person is tracked and the position of the object is inferred from the position of the spatially sensitive position sensor on the person. This information is updated continually on a time scale that is responsive to the tracking requirements of the overall system design. In step 335, the person deposits the object and in step 340 the system identified the ID and position of the object at the time the person releases it (in step 340). In step 345, the "tracking by association" system records the final location and ID. Finally, after releasing the object in step 340—the person receives a new object and proceeds from step 320 through the loop again (illustrated by the dotted line from step 340 to step 320). At the end of step 345 the object ID and location is known by the "tracking by association" system as illustrated by step 345.

The second tracking mechanism consists of a sequence of action that must start with knowing the object location and ID as described in step 315. For the purposes of this discussion, only step 315 in which the ID and location information for the object is transferred to the second tracking mechanism. As explained earlier, the second tracking mechanism may be either related to, a continuation of, or completely unrelated to the first tracking mechanism. In the case where no second tracking mechanism is employed at all, step 315 is a final step for the overall object tracking scope.

FIG. 4 is a flowchart illustrating the method 400 for package retrieval.

Referring to FIG. 4, an enquiry is received by a computing system for the location of an object or a package that is not located in the normal course of business 405. This may be a package that entered a delivery system but did not reach its intended destination. The enquiry initiates the automated package tracking process, 410. The computer system then retrieves data from its memory or storage, 420. This is data related to the observed locations of the package as it passed through the various tracking systems, and in particular to the last instance in time that the package was associated with a person, and more particularly to the location where the package and the person were disassociated (e.g. became separated) 425.

The disassociation event may have been recorded within a vehicle or delivery truck or not, 430. If the event took place within a truck, a person is assigned by the computing system to look in the truck 440. An indication that the package is found will be received by the computing system if the tag on the package is read by a bar code or RFID reader. If the package is not found, a person is assigned to interview the truck driver 445. If the package is found, 460, the process ends 480. If the package is not found, 460, the incident is reported to the claims department 470. If the event did not take place within a truck, but rather at a fixed location, a person is assigned by the computing system to look in the fixed location 450. If the package is not found, then the computing system retrieves data that shows the last person to be associated with the package. An interviewer is then assigned to interview that last person, 455. If the package is found, 460, the process ends, 480. If the package is not found, the incident is reported to the claims department, 470. The information may also be reported to other computing systems by means of the network 270 of FIG. 2. For instance, a delivery company may report a lost object or package to a customer, a manufacturer, a mail-order house, a bank, a credit card company, or a retail establishment.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method for tracking objects, comprising:
   identifying and locating an object using a first method;
   identifying and locating a person using a second method;

associating the object and the person;

tracking the person from a first location to a second location;

storing information associated with the person, the object, and track between the first location and second location; and using the collected information to locate lost objects;

detecting a disassociation of the object from the person, identifying the location of the object upon the disassociation of the object from the person;

issuing a warning if the object and the person improperly associated;

issuing a warning if the second location is not the intended second location;

generating a history of the location of the person when associated with the object; and using the generated history to determine the location of the object, wherein the first method comprises one of reading a bar code associated with the object and reading a radio frequency identification tag associated with the object, wherein the second method comprises reading an active radio frequency identification tag associated with the person, wherein the first location comprises a conveyor system, wherein the second location is within a transport vehicle, and wherein the second location within a transport vehicle is precisely determined.

2. A method for tracking objects, comprising:

associating an object with a person;

identifying and locating the person;

recording a disassociation of the object with the person;

locating the object based upon a location of the disassociation; and receiving an enquiry for the location of the object, retrieving data regarding the association of the object with the person; retrieving the location of the disassociation of the object with the person; assigning a person to search the location of the disassociation for the object; and locating the object.

3. A system for tracking objects, comprising:

first means for determining an identification and location of a person;

second means associated with the person for reading identification data associated with an object; and a computer system connected to the first means and the second means by a network, wherein the computer system receives the identification data read by the second means, identifies the object based on the received identification data, identifies the person associated with the second means, associates the object with the person, collects tracking information regarding the location of the person based on data received from the first means until the person and the object are disassociated, and stores the tracking information, wherein the first means comprises at least one of an identification tag attached to the person comprising a radio frequency identification tag, and a biometric means comprising a video camera for vision-system identification of the person, wherein the second means comprises at least one of a bar code reader, a radio frequency identification reader, a camera, and an ultra-sonic location sensor, wherein the computer system further recieves an enquiry for a location of the object, retrieves the tracking information, and determines the location of the object upon disassociation of the object with the person, and wherein the network comprises a wireless network.

* * * * *